June 30, 1925.

D. B. DIMICK 1,544,057

CAST PIPE AND JOINT THEREFOR

Filed Sept. 16, 1922    2 Sheets-Sheet 1

Inventor
Daniel B. Dimick
by Wilkinson & Giusta
Attorneys

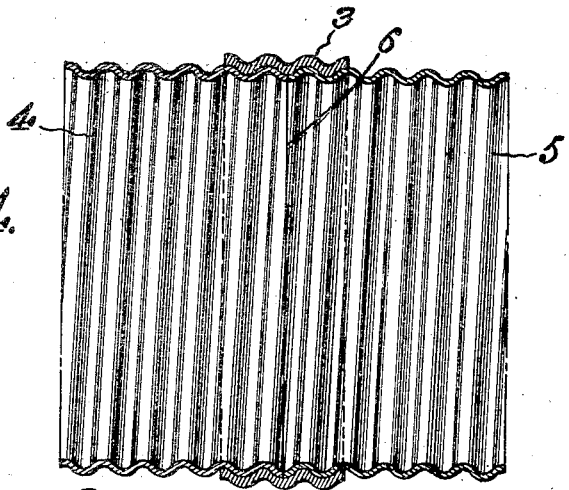
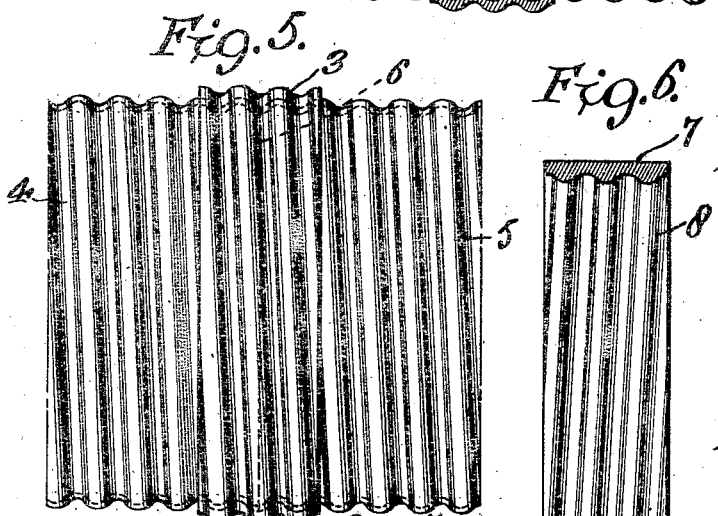
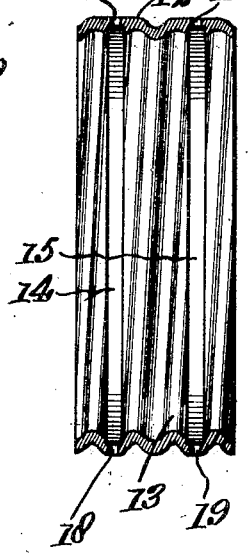
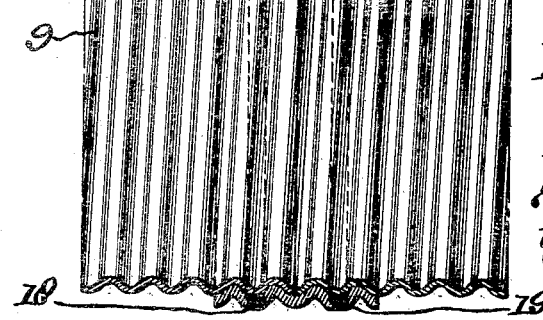

Patented June 30, 1925.

1,544,057

UNITED STATES PATENT OFFICE.

DANIEL BAKER DIMICK, OF BIRMINGHAM, ALABAMA.

CAST PIPE AND JOINT THEREFOR.

Application filed September 16, 1922. Serial No. 588,650.

*To all whom it may concern:*

Be it known that I, DANIEL BAKER DIMICK, a citizen of the United States, residing at Birmingham, in the county of Jefferson and State of Alabama, have invented certain new and useful Improvements in Cast Pipes and Joints Therefor, of which the following is a specification.

The present invention relates to improvements in metallic pipe and has for an object to produce a cast metal article which will be seamless and composed of relatively thin walls to simulate sheet metal and to adapt it for the same uses for which sheet metal pipe are employed, and at the same time to produce cast metal pipe having all of the strength and durability of the sheet metal article.

Sheet metal pipe is today used extensively in all industries and for a large variety of purposes, but it is relatively expensive to produce sheet metal, subsequently to corrugate it and finally to roll and secure it and in the end the article has certain limitations and is deficient in structure because of the seam which permits leakage, must be carefully calked, which is a source of further expense and weakens the pipe along this line.

It is a purpose of the present invention to produce a substitute for the sheet metal pipe which will substantially possess its lightness in weight, its appearance, its strength but which will not be subject to the difficulties above enumerated, and which will be a seamless article made from cast iron.

Moreover the life of corrugated sheet metal pipe is of few years inasmuch as rust action sets in. The sheet metal is steel which corrodes quickly and the pipe is laminated, the layers in time opening and thus allowing the action of rust to go on in the structure. The present pipe is a homogenous structure, granular and cast in a solid piece which is not readily subject to attacks of rust and which being cast iron will last indefinitely.

The method of and apparatus for producing the article herein claimed will be found illustrated and described in my copending application filed of even date herewith, Serial Number 588,649.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a perspective view of an improved metallic pipe constructed according to the present invention.

Figure 4 is a longitudinal section taken through adjacent pipe ends and showing an improved form of pipe joint.

Figure 5 shows the same form of joint in side elevation.

Figure 6 is a longitudinal section through a slightly modified form of pipe joint shown alone.

Figure 7 is a similar view of the still further modified form of joint, and

Figure 8 is a similar section through this last mentioned joint with the pipe ends therein and the filling material in place.

Figure 1:
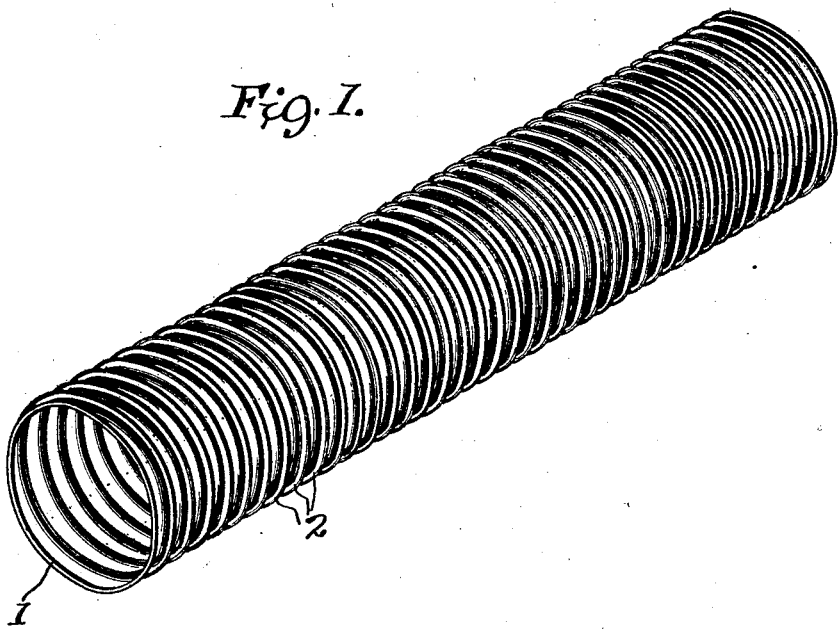
Figure 2:
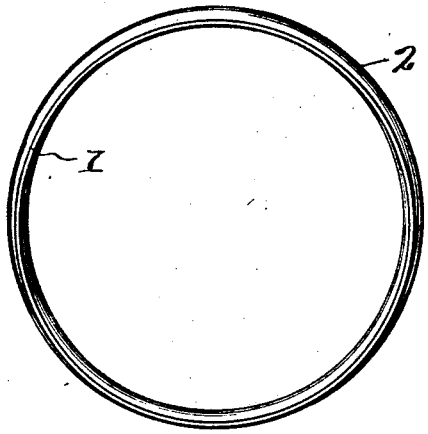
Figure 2 is an end view thereof.
Figure 3:
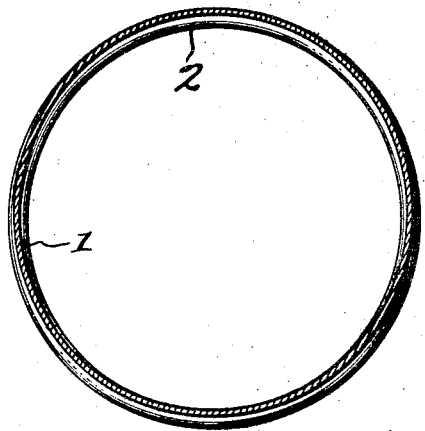
Figure 3 is a cross section taken through the improved pipe.

Referring more particularly to the drawings, the improved pipe is shown in Figures 1, 2 and 3 and it possesses the same general appearance as the sheet metal pipe having a relatively thin cylindrical wall 1 of a suitable diameter to adapt the pipe to the capacity in which it is to be employed. The wall 1 is provided with the internal and external corrugations 2 extending spirally about the axis of the pipe and being of a suitable pitch to adequately strengthen and reinforce the relatively thin wall 1 in order that the pipe may withstand both longitudinal and transverse strains. Now the pipe wall 1 will of course be made in thickness adequate to the calculated strain and this thickness will be varied in many cases, but by being enabled to impose a corrugated formation upon a cast metal cylindrical wall, I secure the very desirable result of being able to reduce the thickness of the wall 1 greatly as compared with cast metal pipe generally which is devoid of corrugations. In this way there is secured a desirable lightness in the pipe itself by which it is enabled to be more easily handled, great quantities of metal are saved and transportation cost reduced.

The wall 1 as clearly appears in Figures 2 and 3, is entirely seamless inasmuch as the metal is cast and flowed uniformly about all parts of the mold in which the pipe is made as is more particularly set up in my copending application above referred to. The annoyances and inconveniences attendant upon the seam of sheet metal pipe are thus obviated and the pipe is leak proof and is of equal strength throughout all points of its circumference.

Cast metal pipe sections as produced in this manner are best secured together by the use of the joint shown in Figures 4 to 8. In Figures 4 and 5 a sleeve 3 is shown being of relatively short length but sufficient to encompass the ends of the pipe sections 4 and 5 for some little distance. The pipe sections 4 and 5 meet together at its center within the sleeve 3. The internal corrugations of the sleeve 3 receive the corrugated ends of the pipe sections by the method of threading. The sleeve 3 may be made of any suitable thickness and it is preferably a little stouter than the walls of the pipe sections, in which case it forms not only a bond but also a protection for the pipe at its weakest points.

Now, while in Figures 4 and 5 the sleeve 3 is shown to be corrugated both within and without, this is not entirely necessary, although where appearance is desired it would probably be preferred to do this inasmuch as the outer surface of the sleeve will then blend agreeably with the pipe and there will be no substantially breaking of the general continuous corrugated appearance, but in Figure 6 the exterior wall 7 of the internally corrugated union sleeve 8 is made flat. These sleeves may also be of cast metal molded as described and shown in my co-pending application and being seamless and having the other advantages already explained.

In Figure 8 the two pipe sections 9 and 10 abut upon the joint line 11 and are secured together by the sleeve 12 which is also shown in Figure 7 and possesses an internal corrugated wall 13 adapted to receive by threading the external corrugations of the pipe sections 9 and 10. Within the sleeve 12 are a pair of annular channels 14 and 15 extending circumferentially and being at opposite sides of the center point in the sleeve in order that these channels which are adapted to receive a lead, or other plastic grouting, sealing or filling material, may lie to opposite sides of the pipe joint 11 in which case any leakage occuring through this joint will be caught in attempting to flow in either direction between the pipe sections and sleeve by the plastic material 16 and 17 shown in Figure 8. This plastic material is flowed in through openings 18 and 19 made through the sleeve 12 concentric with the channels 14 and 15. The metal will then flow into the space between the pipe and sleeve at the channel and will assume faithfully the precise shape of the channel cross section in order to incorporate itself fully and completely in the joint forming an effective seal.

The sleeve 12 may be cast or otherwise produced, but it will be found preferable to cast it with reinforcing and threading corrugations and without seams and in this case the sleeve is also preferably thicker in diameter as compared with the pipe to withstand external strains devolving upon the joint.

It will be appreciated from the foregoing that the invention provides in a relatively inexpensive cast metal pipe all of the advantages of the sheet metal article now used so extensively and furthermore dispenses with the seam and with many manufacturing steps required to produce sheet metal in corrugated pipe form.

The joints herein disclosed may also be found desirable in connection with such a pipe although the pipe may be used with any other joint.

It is obvious that various changes and modifications may be made in the details of construction and design of the above specifically described embodiment of this invention without departing from the spirit thereof, such changes and modifications being restricted only by the scope of the following claims:

What is claimed is:

1. A cast iron pipe section for use as a unit in a pipe line, comprising a cylindrical one-piece seamless casting of substantially uniform diameter throughout its length and having a relatively thin wall, said thin wall having internal and external corrugations extending spirally about the axis of the pipe section and being of sufficient pitch to adequately strengthen and reinforce the relatively thin wall and withstand both longitudinal and transverse strains, said internal and external corrugations extending continuously through the opposite ends of the pipe section to the extremities thereof, whereby a pipe line comprising a row of end to end cast iron pipe sections may have a continuous spiral groove throughout all of the sections of the pipe line.

2. A seamless cast metal spirally corrugated thin walled pipe.

DANIEL BAKER DIMICK.